United States Patent
Powell

(10) Patent No.: US 11,277,544 B2
(45) Date of Patent: Mar. 15, 2022

(54) CAMERA-SPECIFIC DISTORTION CORRECTION

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/582,183

(22) Filed: Sep. 25, 2019

(65) Prior Publication Data

US 2021/0044725 A1     Feb. 11, 2021

Related U.S. Application Data

(60) Provisional application No. 62/884,132, filed on Aug. 7, 2019.

(51) Int. Cl.
    *H04N 5/208*      (2006.01)
    *G06T 7/80*      (2017.01)
    *H04N 5/225*      (2006.01)

(52) U.S. Cl.
CPC ............... *H04N 5/208* (2013.01); *G06T 7/80* (2017.01); *H04N 5/2253* (2013.01); *H04N 5/2254* (2013.01)

(58) Field of Classification Search
CPC .... H04N 5/208; H04N 5/2253; H04N 5/2254; G06T 7/80
USPC .......................................................... 348/625
See application file for complete search history.

(56) References Cited

U.S. PATENT DOCUMENTS

| | | | |
|---|---|---|---|
| 6,618,494 | B1 | 9/2003 | Nonay et al. |
| 8,818,132 | B2 | 8/2014 | Zhang et al. |
| 9,412,154 | B2 | 8/2016 | Ryu et al. |
| 9,438,897 | B2 | 9/2016 | Barreto et al. |
| 9,774,837 | B2 | 9/2017 | Chang et al. |
| 2004/0109080 | A1* | 6/2004 | Chan ............... H04N 5/23212 348/345 |
| 2005/0105822 | A1 | 5/2005 | Narita |
| 2008/0111912 | A1* | 5/2008 | Chen ............... H04N 17/002 348/362 |

(Continued)

FOREIGN PATENT DOCUMENTS

| | | |
|---|---|---|
| CN | 1873389 A | 12/2006 |
| CN | 108269234 A | 7/2018 |

OTHER PUBLICATIONS

"Non Provisional Application Filed in U.S. Appl. No. 15/971,765", filed May 4, 2018, 65 Pages.

(Continued)

*Primary Examiner* — Michael Lee
(74) *Attorney, Agent, or Firm* — Alleman Hall Creasman & Tuttle LLP

(57) ABSTRACT

A camera includes an image sensor, a lens, memory, and a controller. The lens is positioned to direct object light from a scene onto the image sensor. The memory is configured to store a camera-specific optical center of the lens relative to the image sensor. The camera-specific optical center is measured after a position of the lens is center fixed relative to a position of the image sensor. The controller is configured to acquire a raw image of the scene via the image sensor and generate a distortion corrected image from the raw image based on at least the camera-specific optical center.

20 Claims, 10 Drawing Sheets

(56) References Cited

U.S. PATENT DOCUMENTS

| | | | |
|---|---|---|---|
| 2008/0165248 A1 | 7/2008 | Wang et al. | |
| 2008/0218606 A1* | 9/2008 | Yoda | H04N 5/217 |
| | | | 348/241 |
| 2008/0218607 A1* | 9/2008 | Shoji | H04N 5/3572 |
| | | | 348/241 |
| 2008/0225117 A1* | 9/2008 | Seo | H04N 5/23299 |
| | | | 348/143 |
| 2009/0009631 A1* | 1/2009 | Hoshi | H04N 5/2178 |
| | | | 348/231.99 |
| 2010/0086293 A1* | 4/2010 | Iwane | G03B 3/00 |
| | | | 396/91 |
| 2011/0026014 A1* | 2/2011 | Mack | H04N 5/2254 |
| | | | 356/124 |
| 2011/0141323 A1* | 6/2011 | Hyun | H04N 5/3572 |
| | | | 348/241 |
| 2011/0273569 A1 | 11/2011 | Douady et al. | |
| 2015/0192750 A1* | 7/2015 | Shiraishi | G02B 27/62 |
| | | | 29/593 |
| 2015/0254818 A1 | 9/2015 | Li et al. | |
| 2015/0304527 A1* | 10/2015 | Chou | H04N 17/004 |
| | | | 348/187 |
| 2016/0105630 A1* | 4/2016 | Schaffer | H04N 5/765 |
| | | | 348/231.99 |
| 2016/0269629 A1* | 9/2016 | Martin | H04N 5/2259 |
| 2017/0301059 A1* | 10/2017 | Kitashou | G06T 7/73 |

OTHER PUBLICATIONS

Heikkila, et al., "A Four-step Camera Calibration Procedure with Implicit Image Correction", In Proceedings of IEEE Computer Society Conference on Computer Vision and Pattern Recognition, Jun. 17, 1997, pp. 1106-1112.

Wang, et al., "A New Calibration Model and Method of Camera Lens Distortion", In Journal of Pattern Recognition, vol. 41, Issue 2, Feb. 2008, pp. 607-615.

"International Search Report and Written Opinion Issued in PCT Application No. PCT/US20/037340", dated Sep. 2, 2020, 12 Pages.

* cited by examiner

CYLINDRICAL PROJECTION

CAMERA-SPECIFIC DISTORTION CORRECTION

CROSS REFERENCE TO RELATED APPLICATIONS

This application claims priority to U.S. Provisional Patent Application Ser. No. 62/884,132, filed Aug. 7, 2019, the entirety of which is hereby incorporated herein by reference for all purposes.

BACKGROUND

A camera may produce images having distortion attributed to the camera's lens, as well as alignment between the camera's lens and the camera's image sensor. In most cases, distortion may increase with the field angle of the lens, such that a lens accepting a larger field of view is more susceptible to distortion than a lens with a smaller field of view.

SUMMARY

A camera includes an image sensor, a lens, memory, and a controller. The lens is positioned to direct object light from a scene onto the image sensor. The memory is configured to store a camera-specific optical center of the lens relative to the image sensor. The camera-specific optical center is measured after a position of the lens is center fixed relative to a position of the image sensor. The controller is configured to acquire a raw image of the scene via the image sensor and generate a distortion corrected image from the raw image based on at least the camera-specific optical center.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
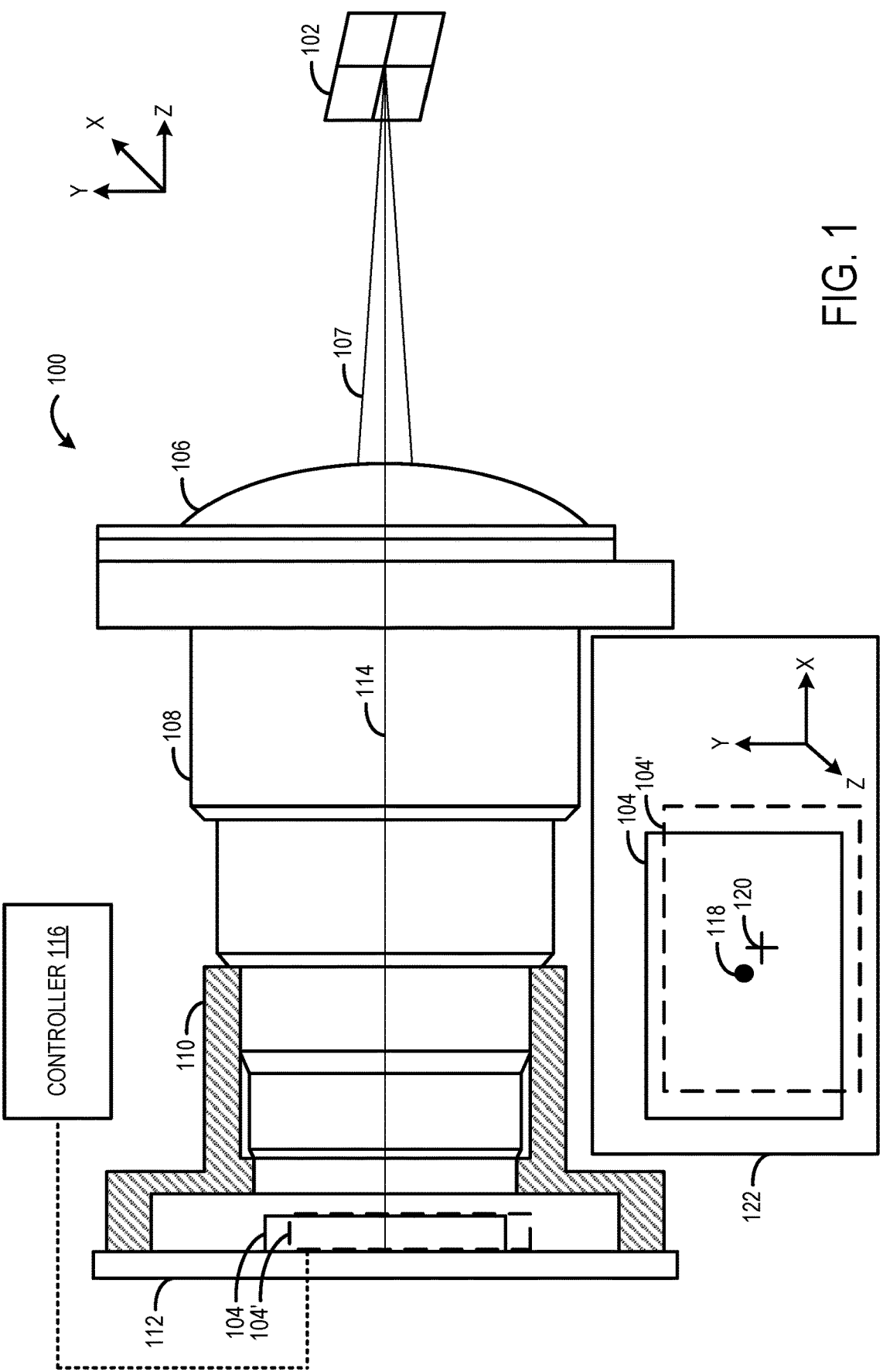
FIG. 1 schematically shows an example camera.

Cameras may be calibrated to correct for lens distortion using different techniques. As one example, photogrammetric calibration may be performed, where precisely known objects are imaged, such as three dimensional (3D) orthogonal cube corner face planes or two dimensional (2D) planes. The imaged objects may have precise known spatial translations that may be used to calibrate a camera. As another example, self-calibration may be performed, where data from multiple images from different moved positions of the same camera in a static object scene is utilized to calibrate the camera. As yet another example, checkerboard calibration may be performed where multiple images of a checkerboard target captured at various orientations in an object scene are utilized to determine intrinsic parameters of a camera.

All of these calibration techniques provide calibration for only a specific camera. Such calibration techniques may be tedious to perform due to the need to acquire and analyze a specific set of structured calibration images. Due to the tediousness of performing such calibration techniques, calibrating each camera of a large volume of cameras using such calibration techniques would be undesirable. For volume manufacturing, where it may be desirable to utilize a single camera calibration for all cameras, these calibration techniques may require sampling of multiple cameras to arrive at a reasonable representation of a manufactured lot. However, using this representative sampling calibration approach may result in the determined calibration parameters not accurately representing the actual calibration parameters of the other cameras of the manufacturing lot, thus resulting in inaccurate calibration of at least a portion of the other cameras. Further, such an approach does not address variation in positional offset between lens optical center and image sensor center within the manufactured lot.

Accordingly, the present description is directed to an approach for achieving high-quality image distortion correction on an individual camera basis without using checkerboard calibration or other tedious structured image calibration techniques. In particular, the distortion correction approach enables a camera to generate a distortion corrected image from a raw image based on at least a camera-specific optical center of a lens of the camera relative to an image sensor of the camera. The camera-specific optical center is measured after a position of the lens is center fixed relative to a position of the image sensor. As used herein, the term "center fixed" means the position of the lens is fixed along at least x and y axes relative to a position of the image sensor. As used herein, the term "center fixed" is not meant to exclude minor relative movements attributed to autofocus adjustments, manufacturing imperfections, or any unintentional relative movement between the lens and the image sensor. For example, the camera-specific optical center may be measured by a manufacturer at an individual camera level (e.g. measured at a factory during manufacturing), and stored in memory of the camera to be made available for distortion correction on a per camera basis. In some examples, the camera-specific optical center may be measured as a part of a typical quality testing process performed by the manufacturer to ensure that the camera meets manufacturing standards.

Such a camera-specific calibration approach may achieve higher accuracy distortion correction than batch approaches where distortion correction for a plurality of cameras is inferred from actual checkerboard calibration of one representative camera. Moreover, such a camera-specific calibration approach may reduce camera manufacturing costs relative to using a checkerboard calibration technique, because the complexity of measuring the optical center of a camera in an automated manner may be less than acquiring structured checkerboard images from different angles.

FIG. 1 schematically shows an example camera 100 in simplified form. The camera 100 may be incorporated into any suitable electronic device, such as a single camera device, a multi-camera device (e.g., a 360 degree camera), a mobile phone, a head-mounted virtual reality or augmented reality device, a tablet, a laptop, a remote-controlled drone, a video conferencing device, or another type of electronic device.

The camera 100 is configured to image a scene 102. The camera 100 includes an image sensor 104 and a lens 106 positioned to direct object light 107 from the scene 102 onto the image sensor 104. The lens 106 may take any suitable shape and may including any suitable optical material having any suitable optical characteristics. In some implementations, the lens 106 may be a system of two or more lenses or other optical elements. The lens 106, having lens elements held in lens barrel 108, may be maintained in a center fixed position relative to the image sensor 104 via a holder mount structure 110. The holder mount structure 110 may include any suitable material. In one example, the holder mount structure 110 includes metal, such as aluminum. In another example, the holder mount structure 110 includes a polymer, such as a glass-filled polymer. The lens 106 may be operatively coupled to the holder mount structure 110 in any suitable manner. In one example, the lens barrel 108 and the holder mount structure 110 each may be threaded, such that the lens 106 is screwed into the holder mount structure 110. In another example, the lens barrel 108 may be cylindrical without threads and bonded to the holder mount structure 110 via an adhesive, such as a rod-shaped barrel placed in a tubular mount with a gap for adhesive. In some examples, the holder mount structure 110 is a rigid holder structure that fixes the lens barrel 108, and thus all elements in the lens 106 relative to the image sensor 104 along every axis in six degrees of freedom (e.g., x, y, z, tip, tilt, azimuth rotation). For example, a fixed-focus camera may have such an arrangement. In some examples, the holder mount structure 110 may allow movement of the lens barrel 108 relative to the image sensor along one or more axes (e.g., for image stabilization and/or focus, such as by placing an auto-focus voice-coil actuator between lens barrel 108 and holder mount structure 110). In such examples, the lens 106 is still center fixed relative to the image sensor 104 even though the position of the lens 106 may move along the z axis relative to the position of the image sensor 104.

In the illustrated nonlimiting example camera, the lens barrel 108 is operatively coupled to the holder mount structure 110. The holder mount structure 110 is mounted to a printed circuit board (PCB) 112. In one example, the holder mount structure 110 is bonded to the PCB 112 via an adhesive. The image sensor 104 is mounted on the PCB 112 such that an optical axis 114 of the lens 106 is substantially aligned with a center of the image sensor 104. In particular, the lens barrel 108, the holder mount structure 110, and the PCB 112 collectively maintain the lens 106 in optical alignment with the image sensor 104 (e.g., for the case of using a threaded lens barrel 108 and holder mount structure 110, the holder mount structure 110 may be bonded in position relative to PCB 112 to fix x, y, z position and tip/tilt angle while threads may be substantially used to set the focus). Alternatively, as may be the case for using active alignment (AA), pre-focus position may be set by optically, or mechanically, fixing focus position between lens barrel 108 and holder mount structure 110. Once fixed in this manner, the lens and holder assembly may be actively adjusted in all degrees of freedom and bonded with a gap bond between holder mount structure 110 and PCB 112 to fix x, y, final z focus, tip, tilt and azimuth rotation.

The camera 100 further comprises a controller 116 configured to control the image sensor 104 to acquire images of the scene 102 as well as to perform other control operations of the camera 100 as discussed herein. The controller 116 may include a logic subsystem and a storage subsystem. The logic subsystem includes one or more physical devices configured to execute instructions held by the storage subsystem to enact any operation, algorithm, computation, or transformation disclosed herein. In some implementations, the logic subsystem may take the form of an application-specific integrated circuit (ASIC) or system-on-a-chip (SoC), in which some or all of the instructions are hardware- or firmware-encoded. The logic subsystem and the storage subsystem of the controller 116 are discussed in further detail with reference to FIG. 10.

During the manufacturing process of the camera 100, manufacturing tolerances of the camera 100 may result in camera-to-camera variations in optical alignment of the image sensor 104 and the lens 106 that may result in a position of the image sensor being shifted from an ideal position that is aligned with the lens 106. The image sensor 104' is shown having a position that is shifted relative to the ideal position of the image sensor 104 that is aligned with the lens 106. Moreover, manufacturing tolerances of the lens 106 itself may contribute to variations in optical alignment of the image sensor 104 and the lens 106. As shown in the sidebar 122, the optical axis 114 of the lens 106 is centered at an actual optical center 118 of the lens 106 relative to the image sensor 104 when the image sensor 104 is ideally aligned with the lens 106. However, the actual optical center 118 of the lens 106 is offset from a center 120 of the image sensor 104' when the image sensor 104' has a position that is shifted relative to the ideal position of the image sensor 104. The difference between the center 120 of the image sensor 104' and the actual optical center 118 of the lens 106 may affect the image distortion attributed to the lens.

As used herein, the term "raw image" means an image that is generated without any distortion correction and may include monochrome images, color images, and images that have been at least partially processed (e.g., applying a Bayer filter). The actual optical center 118 may vary from camera to camera such that different cameras generate raw images having different distortion based on having different camera-specific optical centers. While both error in alignment of optical center as well as fabrication tolerance of the lens (e.g., variation of effective focal length, EFL, for a specific lens design) contribute to distortion for a camera image, the contribution of variation due to lens fabrication tolerance may be substantially small compared to the contribution of error in alignment of optical center of a camera for state of the art lenses (e.g., lens tolerance variation <10 pixels at maximum field angle which typically scales down with lower field angle (for example 0 pixels at 0F), compared to as much as +/−50 pixels direct offset in optical center for an example holder mount process, or compared to as much as +/−20 pixels direct offset in optical center for an example active alignment process). As such, distortion for an image may be substantially corrected by use of optical center along with lens nominal distortion data. Further, when considering the impact of image stretching or compression (i.e., tilt error) due to a tilted image sensor plane, note that such tilt error may be significantly limited for cameras having reasonable modulation transfer function (MTF) performance requirements over the field of view of the camera. Further, cameras having a limited depth of focus may have implied limits on maximum allowed tilt error based on additional camera performance requirements. As such, distortion due to tilt error may typically be considered small in comparison to distortion due to camera to camera variation of optical center position.

In one example, the actual optical center 118 may be measured using a lens pointing measurement setup which accurately and/or repeatably holds the lens optical axis 114 pointing to a target by use of active alignment or repeatable kinematic mounting of the lens barrel 108. The lens pointing measurement setup forms an image of the target in the scene 102 on the image sensor 104. The pixel position at which the optical axis 114 intersects with a plane of the image sensor 104 indicates the measured optical center 118 at the image sensor 104. The measured optical center 118 may be used as the origin for a radially symmetric distortion correction for the camera 100.

In another example, the actual optical center 118 may be measured by projecting a flat field of illumination through lens 106 onto the image sensor 104, and measuring a centroid of an image intensity profile to determine the optical center. Note that if the camera includes lenses that have limited Relative Illumination roll-off, the pointing measurement may be expected to provide higher accuracy for optical center measurement. Note that other methods may be used to measure the actual optical center 118 with respect to the lens optical axis 114 at the plane of the image sensor 104. For example, a laser beam aligned with the optical axis 114 may be used to measure the optical center 118. Even the checkerboard method may be used to determine optical center, however, as previously noted, such an approach may add complexity, time and/or cost to each measurement, as compared to a pointing measurement test.

Figure 2:
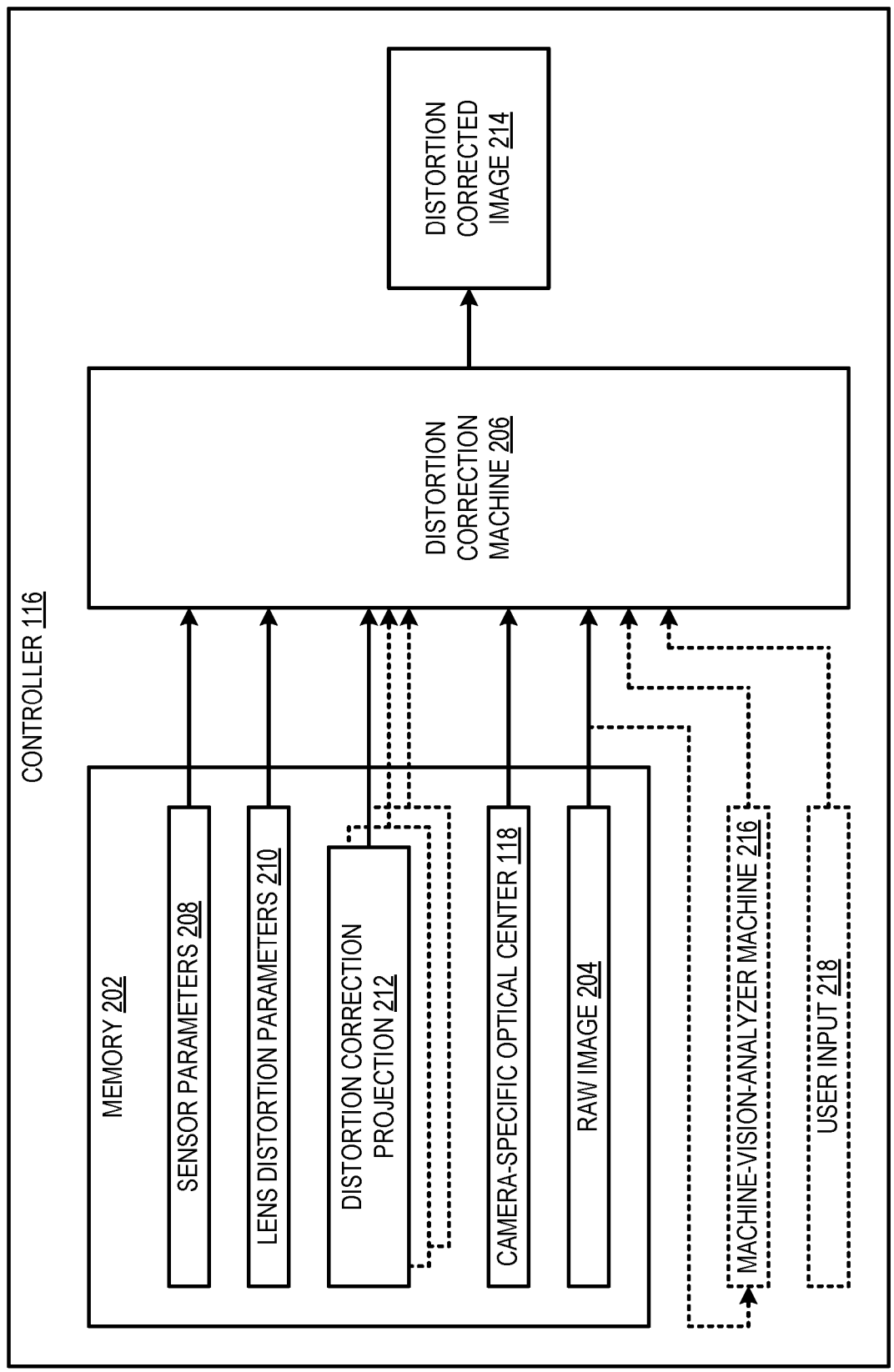
FIG. 2 schematically shows an example camera controller configured to generate distortion corrected images based on at least a camera-specific optical center of a camera.

The camera 100 may be configured to correct such camera-specific image distortion in a highly accurate manner based on a camera-specific measurement of the optical center 118 of the camera. As shown in FIG. 2, the controller 116 is configured to acquire a raw image 204 of a scene via the image sensor 104. The controller 116 may be configured to load the raw image 204 in memory 202 of the camera 202. The controller 116 is further configured to generate a distortion corrected image 214 from the raw image 204 based on at least the camera-specific optical center 118 of the camera 100. The camera-specific optical center 118 may be measured after a position of the lens 106 is center fixed relative to a position of the image sensor 104. For example, the camera-specific optical center 118 may be measured as part of a quality testing process performed by the manufacturer to ensure that the camera 100 meets manufacturing standards. The measured camera-specific optical center 118 may be stored in the memory 202 (e.g., electrically erasable programmable read-only memory (EEPROM) or other non-volatile memory) such that the camera-specific optical center 118 may be made available for use in performing distortion correction operations.

In one example, the camera-specific optical center 118 may be measured by placing the camera 100 in an alignment station that is selectively movable to align the optical axis of the lens 106 with an alignment laser that is configured to direct laser light through the center of a target. The alignment station may support x, y, z translation as well as tip and tilt of the camera 100 relative to the alignment laser to achieve optical alignment. The target and the laser light of the alignment laser may be imaged by the image sensor 104 of the camera 100 to acquire a raw image that includes a position of the alignment laser light relative to a center position of the image sensor 104. This position indicates the measured actual camera-specific optical center 118 of the camera 100. The measured camera-specific optical center 118 may be represented as (x, y) coordinates in a coordinate space of the image sensor 104. Due to lens distortion and/or alignment variances, the measured camera-specific optical center 118 may be offset from an actual center position of the image sensor 104.

In one example, the optical axis 114 of the lens 106 is used as a reference for measuring the camera-specific optical center 118. This may be referred to as a lens fixed/sensor float type of measurement. In other examples, the PCB 112/image sensor 104 may be used as a reference for measuring the optical center 118. This type of measurement may be referred to as lens float/sensor fixed type of measurement. In some cases, the lens float/sensor fixed measurement approach may require the position of the lens 106 to be shifted relative to the image sensor 104 in order to compensate for an apparent field angle shift of the target based on the position of the PCB 112/image sensor 104 relative to the alignment laser. While both methods may be used to capture optical center data, in some cases the type of measurement method may be selected based on how the camera will be mounted (e.g., sensor PCB vs mounting lens barrel 108 which closely matches lens optical axis). It should be noted that since distortion is substantially radial with respect to the lens optical axis 114 for state-of-the-art lenses, measuring pointing with respect to the lens optical axis (e.g., sensor float) may provide optimum results for cameras that include such lenses. Further, cameras having an optical center determined with reference to the lens optical axis may provide advantages for projection scenarios where the camera is used to image a known object plane orientation, a cylindrical surface, or a spherical surface having a known Y axis pointing, since the camera may be mounted to a device chassis via the lens barrel. Such an arrangement may allow for the orientation of the lens optical axis to be controlled relative to object scene more directly. Also, it should be noted that such a measurement approach may be more suitable for camera devices having lenses that are large enough to mount directly, or where the lens mass is on an order or higher than a mass of the image sensor PCB.

Using an alignment station is one nonlimiting example approach for measuring the camera-specific optical center 118. Note that the above described approach may be used to measure the actual optical center of different cameras with high accuracy in a relatively quick and repeatably consistent fashion that allows for high volume processing of entire manufacturing lots of cameras. It will be appreciated that the camera-specific optical center 118 may be measured for individual cameras in any suitable manner.

The controller 116 may include a distortion correction machine 206 configured to translate pixel locations of pixels of the raw image 204 according to a distortion correction projection 212 that is based on at least the measured camera-specific optical center 118 of the camera 100 to generate the distortion corrected image 214. Note that the pixel locations of different pixels in the raw image may be translated and/or interpolated, as by a mesh grid indicating mapping of each integer (x, y) pixel of a distortion corrected image to a floating-point position within the original input image (x', y'), on an individual pixel basis based on the distortion correction projection. As such, in different instances, pixel locations of different pixels may be translated differently (e.g., different direction and/or distance of translation for different pixels), pixel locations of different pixels may be translated the same (e.g., same direction and/or distance of translation for different pixels), and/or pixel locations of some pixels may remain the same between the raw image 204 and the distortion corrected image 214. Furthermore, distortion correction may include stretching and/or compressing portions of an image. More particularly, in one example, the distortion correction machine 206 may be configured to perform distortion correction mapping according to a distortion correction projection 212 that uses the measured camera-specific optical center 118 and optionally image sensor parameters 208 and/or lens distortion parameters 210 as inputs. In one example, the image sensor parameters 208 may include a resolution of the image sensor 104 (e.g., a number of pixels included in the image sensor in both x and y dimensions) and a pixel size of pixels of the image sensor 104 (e.g., size of pixel in both x and y dimensions). In other examples, other image sensor parameters may be considered for the distortion correction projection 212. In one example, the lens distortion parameters 210 may include distortion data, such as image real height versus field angle of the lens 106. 'Real IH vs Field Angle' or 'Real Height vs Angle' are characteristic distortion curves that describe a change in radial distance from the lens optical center at the image sensor image plane with the field angle in the object space from the optical axis (or 0 deg field angle, or 0F). Note that distortion data typically includes: 'Field Angle' or 'Y Angle' (e.g., degrees from the optic axis in the object scene), Real Image Height (e.g., millimeters from image center for actual lens design), and Reference Height' (e.g., millimeters from image center for an ideal f-θ lens), and the effective focal length (EFL) of the lens may be determined from knowledge of this data, whether provided in terms of TV distortion or provided in terms of f-θ distortion. For instance, using f-θ distortion data, the EFL may be determined by $f=H_{Ref}(n)/[(\pi/180)\theta(n)]$, for nth data. For TV distortion, distortion data may be converted into terms of f-θ distortion by $f=H_{Ref}(n)/\tan[(\pi/180)\theta(n)]$, for nth data. Thus, the design EFL may be determined from and included in the distortion parameters 210. In some examples, the distortion data may be estimated using a lookup table or fit of the real height data and reference height data, such that the ratio of the radial Real Height to the radial Reference Height $H_{Re}/H_{Ref}$ at the image sensor image plane may be determined for any given Field Angle φ accepted by the lens field of view, by interpolation of the lookup table or ratio of the fit equations. The distortion data may be estimated in any suitable manner. In other examples, other lens distortion parameters may be considered for the distortion correction projection 212. In still some other examples, the distortion correction machine 206 optionally may be configured to generate the distortion corrected image 214 further based at least on an image sensor rotation parameter. The image sensor rotation parameter may be considered for pixel mapping in a scenario where the distortion corrected image 214 is included in a plurality of images that are stitched together (e.g., panoramic or 3D image). Further, the distortion correction method described herein may serve both centered image sensor and offset image sensor configurations with respect to the lens optical axis. The distortion correction method may function for any target optical center location. As one example, the distortion correction method may function in the case of a target optical center matching the center of the image sensor 104. As another example, the distortion correction method may function in the case of a target optical center purposely offset from and with respect to the center of the image sensor 104. Accordingly, the distortion correction method may support usage of an offset image sensor to provide an angular bias of the camera field of view.

The sensor parameters 208 and the lens distortion parameters 210 may be known a priori for the particular type of camera configuration that uses the lens 106 and the image sensor 104. For example, the sensor parameters 208 and the lens distortion parameters 210 may be the same for every camera in a particular manufacturing lot, whereas each camera of the particular manufacturing lot may have a different measured camera-specific optical center due to variations in manufacturing of the cameras. In some implementations, the sensor parameters 208 and lens distortion parameters 210 may be stored in memory 202, and in some implementations the sensor parameters 208 and lens distortion parameters may be hard coded into the distortion correction algorithm(s). Further, in some examples the mesh grid for interpolation of the distortion corrected image may be implemented as being oversized by an expected pixel tolerance of optical center variation (e.g., +/−50 pixels) for the manufacturing lot. The mesh grid may be cropped in firmware and/or software to match an output size based on a given offset for each camera case from stored optical center data. In other examples, the mesh grid for interpolation may be of the same size as the distortion corrected output image where the mesh grid is calculated once upon initialization of a camera based on the stored optical center data.

The distortion correction projection 212 may define a relationship between the pixel locations of the raw image 204 and the translated pixel locations of the distortion corrected image 214 as an inverse function in which the sensor coordinates are mapped to projection plane and/or surface coordinates of the distortion correction projection 212. The distortion correction projection 212 may take any suitable form. For example, the distortion correction projection 212 may include a rectilinear projection, a cylindrical projection, a spherical projection, or a combination of two or more different distortion correction projections. Further, other orientations of lens pointing and projection may be used. For example, 360° horizontal sweep imaging of a scene using fisheye lenses having optical axis pointing substantially upward or downward may be used with either or a combination of spherical projection and cylindrical projection.

Figure 3:
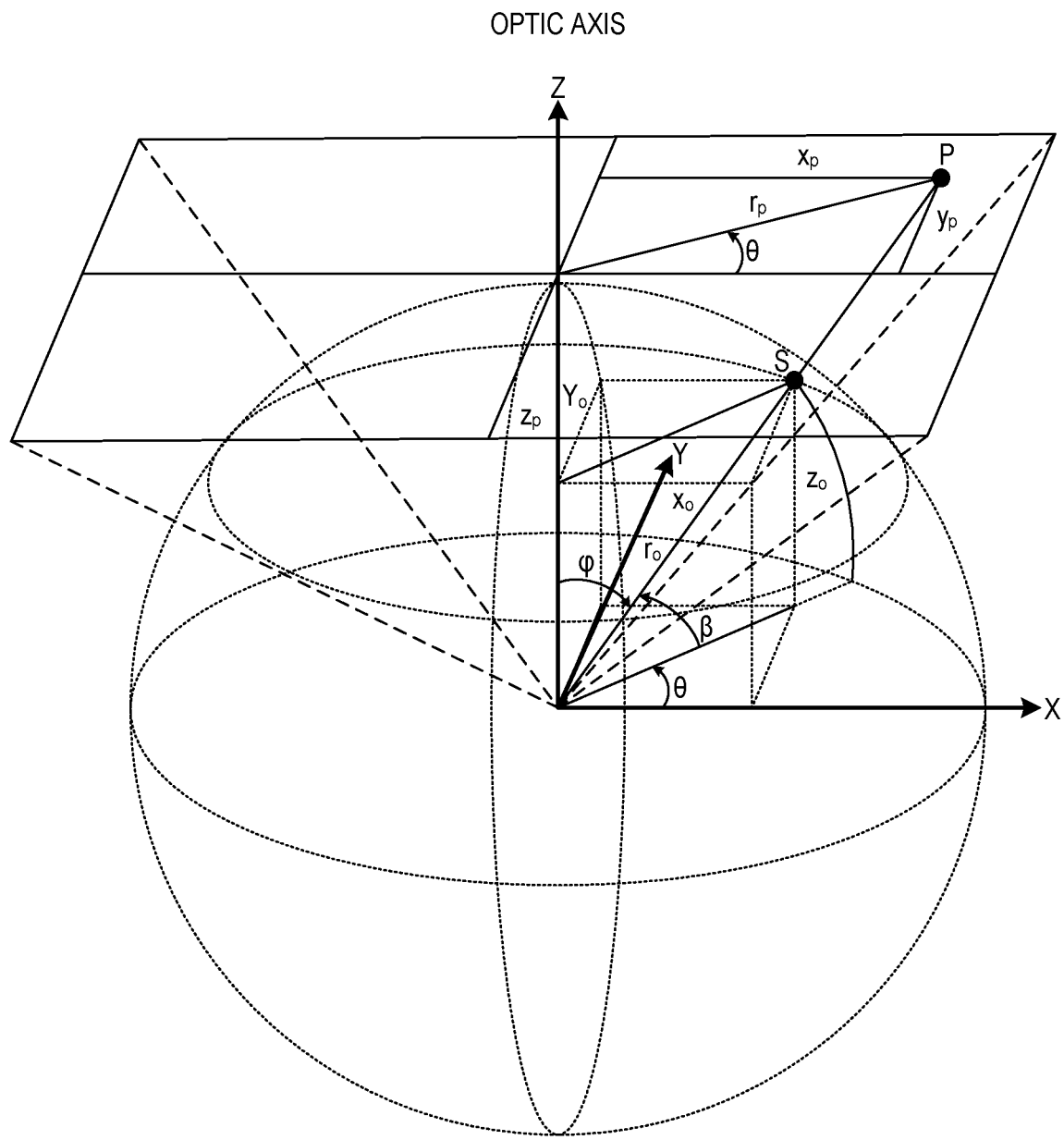
FIG. 3 schematically shows an example rectilinear distortion correction projection.
Figure 4:
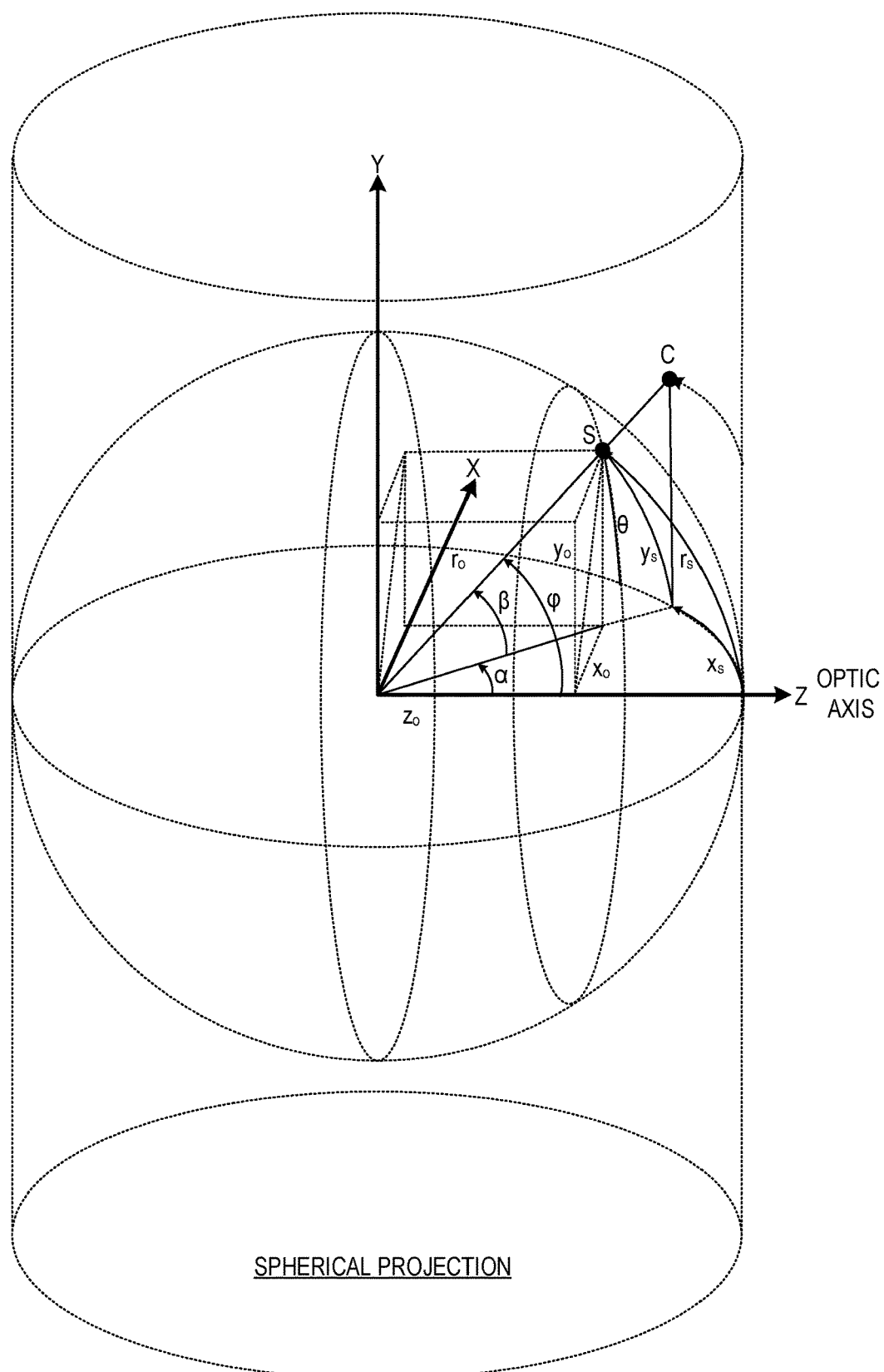
FIG. 4 schematically shows an example spherical distortion correction projection.
Figure 5:
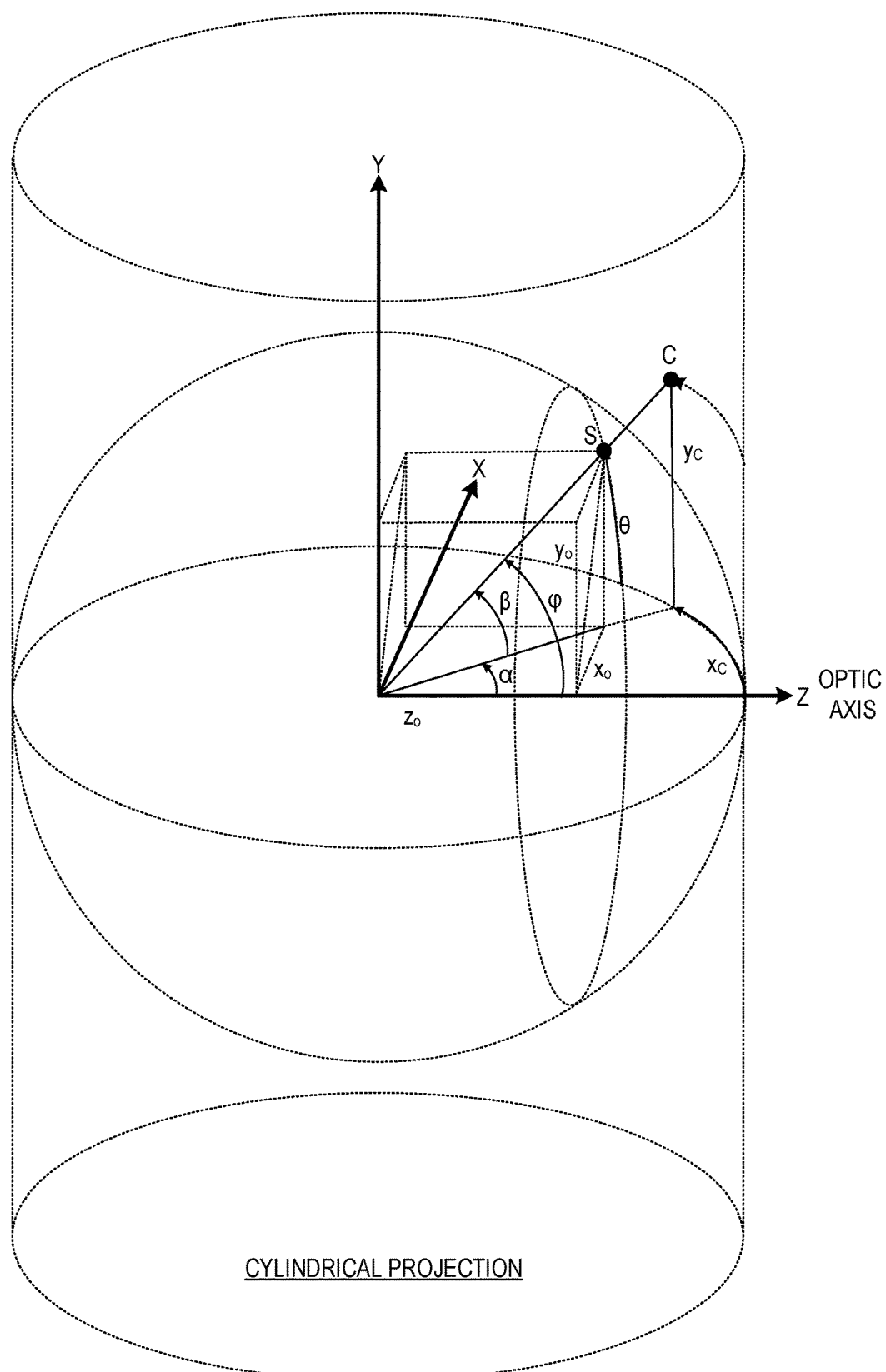
FIG. 5 schematically shows an example cylindrical distortion correction projection.

FIGS. 3-5 show different example distortion correction projections that may be used to translate pixel locations of pixels of the raw image 204 to translated pixel locations in order to generate the distortion corrected image.

FIG. 3 schematically shows an example rectilinear distortion correction projection. The rectilinear projection maps image sensor coordinates in image sensor space to projection plane coordinates of a rectilinear projection plane. Prior to this mapping, the pixel grid of the raw image is parameterized into corresponding physical dimensions and may be shifted based on the measured camera-specific optical center, thus improving the resulting distortion correction for that particular camera, since the origin of the projection may be substantially matched to the optical axis of the lens. The image sensor coordinates are represented by $(x_s, y_s)$ for the raw image. Projection distance $z_p$ may be used as a scaler for setting the field of view captured within the corrected image pixel positions. For example, for a horizontal width of the image sensor represented by H, the corrected image may be set to subtend and include a target horizontal field of view (HFOV) by setting $$z_p \text{ as: } z_p = \left( \frac{H}{2\tan\left(\left(\frac{\pi}{180}\right)\left(\frac{HFOV}{2}\right)\right)} \right).$$

The rectilinear projection defines the relationship between the image sensor coordinates and the projection plane coordinates (coordinates on the plane represented by position $(x_p, y_p)$, thus positions in the corrected image) as an inverse function in the form of, $x_s(f, x_p, y_p, z_p)$ & $y_s(f, x_p, y_p, z_p)$, where $$\varphi = \tan^{-1}\left(\frac{r_p}{z_p}\right),$$

$$r_p = \sqrt{x_p^2 + y_p^2},$$

$z_p$ = distance scaler to plane

For the projection plane coordinates $(x_p, y_p)$:

$$x_p = r_p\cos(\theta) \text{ where } \cos(\theta) = \frac{x_p}{r_p} = \frac{x_p}{\sqrt{x_p^2 + y_p^2}}$$

$$y_p = r_p\sin(\theta) \text{ where } \sin(\theta) = \frac{y_p}{r_p} = \frac{y_p}{\sqrt{x_p^2 + y_p^2}}$$

The radius $r_s$ on the image sensor from an angle to the image height may be represented as a function: $r_s(\varphi)$. For example, this relationship may be determined via a distortion lookup table which may be used to interpolate a radial image height for any given field angle, a fit equation, or estimated with a parabolic percentage (p) distortion from a f-theta at Field Angle. The radius $r_s$ may be determined as follows:

$$r_s(\varphi) = f\varphi_D(\varphi) \sim f\left(\varphi + \frac{p\varphi^3}{\varphi_o^2}\right)$$

For $\varphi$ in radians $$\varphi = \tan^{-1}\left(\frac{\sqrt{x_p^2 + y_p^2}}{z_p}\right)$$

The distortion lookup table may be defined as follows:

$$\varphi_D(\varphi) = LUT(\varphi) = \varphi \frac{H_{Re}(\varphi)}{H_{Ref}(\varphi)}$$

For the sensor coordinates $(x_s, y_s)$:

$$y_s = r_s\sin(\theta) = f\varphi_D(\varphi)\left(\frac{y_p}{\sqrt{x_p^2 + y_p^2}}\right) \sim f\left(\varphi + \frac{p\varphi^3}{\varphi_o^2}\right)\left(\frac{y_p}{\sqrt{x_p^2 + y_p^2}}\right)$$

$$x_s = r_s\cos(\theta) = f\varphi_D(\varphi)\left(\frac{x_p}{\sqrt{x_p^2 + y_p^2}}\right) \sim f\left(\varphi + \frac{p\varphi^3}{\varphi_o^2}\right)\left(\frac{x_p}{\sqrt{x_p^2 + y_p^2}}\right)$$

FIG. 4 schematically shows an example spherical distortion correction projection. The spherical projection maps image sensor coordinates in image sensor space to spherical coordinates. Prior to this mapping, the pixel grid of the raw image is parameterized into corresponding physical dimensions and may be shifted based on the measured camera-specific optical center, thus improving the resulting distortion correction for that particular camera, since the origin of the projection may be substantially matched to the optical axis of the lens. The image sensor coordinates are represented by (x, y) for the raw image. Projection radius $R_s$ may be used as a scaler for setting the field of view captured within the corrected image pixel positions. For example, for a field angle θ representing a real height $H_{Re}(\theta)$ of the horizontal edge of the image sensor, the corrected image may be set to subtend and include a target HFOV by setting $R_s$ as:

$$R_s = f\left(\frac{2\theta}{HFOV}\right)\left(\frac{H_{Re}(\theta)}{H_{Ref}(\theta)}\right).$$

The spherical projection defines the relationship between the image sensor coordinates and the spherical coordinates (coordinates on the sphere represented by the azimuth arclength $x_s$ and the elevation arclength $y_s$, thus positions in the corrected image) as an inverse function in the form of, $x(f, x_s, y_s, R_s)$ & $y(f, x_s, y_s, R_s)$, where $$\varphi = \frac{r_s}{f}, \alpha = \frac{x_s}{R_s}, \beta = \left(\frac{y_s}{R_s}\right),$$

$$x_o = z_o\tan(\alpha) = z_o\tan\left(\frac{x_s}{R_s}\right) = \sqrt{1 - x_o^2 - y_o^2}\,\tan\left(\frac{x_s}{R_s}\right)$$

$$x_o = \sqrt{\frac{(1 - y_o^2)\tan^2\left(\frac{x_s}{R_s}\right)}{\left(1 + \tan^2\left(\frac{x_s}{R_s}\right)\right)}} =$$

$$\sqrt{\frac{\left(1 - \left(\sin\left(\frac{y_s}{R_s}\right)\right)^2\right)\tan^2\left(\frac{x_s}{R_s}\right)}{\left(1 + \tan^2\left(\frac{x_s}{R_s}\right)\right)}} = \sqrt{\cos^2\left(\frac{y_s}{R_s}\right)\sin^2\left(\frac{x_s}{R_s}\right)}$$

$$y_o = \sin(\beta) = \sin\left(\frac{y_s}{R_s}\right)$$

Radius $r_o$ may be determined as follows:

$$\sin(\varphi) = r_o = \sqrt{x_o^2 + y_o^2} = \sqrt{\cos^2\left(\frac{y_s}{R_s}\right)\sin^2\left(\frac{x_s}{R_s}\right) + \sin^2\left(\frac{y_s}{R_s}\right)}$$

Thus, for $\varphi$:

$$\varphi = \sin^{-1}(r_o) = \sin^{-1}\left(\sqrt{\cos^2\left(\frac{y_s}{R_s}\right)\sin^2\left(\frac{x_s}{R_s}\right) + \sin^2\left(\frac{y_s}{R_s}\right)}\right)$$

For unit radius, the factor c may define the ratio of φ to sin(φ) as follows:

$$y = fcy_o, \; x = \text{sgn}(x_s)fcx_o, \text{ where } c = \frac{\varphi_D(\varphi)}{\sin(\varphi)}$$

with the distortion lookup table being defined as:

$$\varphi_D(\varphi) = LUT(\varphi) = \varphi \frac{H_{Re}(\varphi)}{H_{Ref}(\varphi)} \text{ or } c \sim \frac{\varphi\left(1 + \left(\frac{p_o \varphi^2}{\varphi_o^2}\right)\right)}{\sin(\varphi)}$$

for a percentage distortion $p_o$ at field angle $\varphi_o$(rad).

FIG. 5 schematically shows an example cylindrical distortion correction projection. The cylindrical projection maps image sensor coordinates in image sensor space to cylindrical coordinates. Prior to this mapping, the pixel grid of the raw image is parameterized into corresponding physical dimensions and may be shifted based on the measured camera-specific optical center, thus improving the resulting distortion correction for that particular camera, since the origin of the projection may be substantially matched to the optical axis of the lens. The image sensor coordinates are represented by (x, y) for the raw image. Projection radius $R_c$ may be used as a scaler for setting the field of view captured within the corrected image pixel positions. For example, for a field angle θ representing a real height $H_{Re}(\theta)$ of the horizontal edge of the image sensor, the corrected image may be set to subtend and include a target HFOV by setting $R_c$ as:

$$R_c = f\left(\frac{2\theta}{HFOV}\right)\left(\frac{H_{Re}(\theta)}{H_{Ref}(\theta)}\right).$$

The cylindrical projection defines the relationship between the image sensor coordinates and the cylindrical coordinates (coordinates on the cylinder represented by the azimuth arclength $x_c$ and the height length $y_c$, thus positions in the corrected image) as an inverse function in the form of, x(f, $R_c$, $x_c$, $y_c$) & y(f, $R_c$, $x_c$, $y_c$), where $$\alpha = \frac{x_c}{R_c}, \; \beta = \tan^{-1}\left(\frac{y_c}{R_c}\right)$$

$$x_o = z_o\tan(\alpha) = z_o\tan\left(\frac{x_c}{R_c}\right) = \sqrt{1 - x_o^2 - y_o^2}\tan\left(\frac{x_c}{R_c}\right)$$

$$x_o = \sqrt{\frac{(1-y_o^2)\tan^2\left(\frac{x_c}{R_c}\right)}{\left(1 + \tan^2\left(\frac{x_c}{R_c}\right)\right)}} =$$

$$\sqrt{\frac{\left(1 - \left(\sin\left(\tan^{-1}\left(\frac{y_c}{R_c}\right)\right)\right)^2\right)\tan^2\left(\frac{x_c}{R_c}\right)}{\left(1 + \tan^2\left(\frac{x_c}{R_c}\right)\right)}} = \sqrt{\frac{R_c^2\sin^2\left(\frac{x_c}{R_c}\right)}{R_c^2 + y_c^2}}$$

$$y_o = \sin(\beta) = \sin\left(\tan^{-1}\left(\frac{y_c}{R_c}\right)\right) = \frac{y_c}{R_c\sqrt{1 + \frac{y_c^2}{R_c^2}}}$$

Radius $r_o$ may be determined as follows:

$$\sin(\varphi) = r_o = \sqrt{x_o^2 + y_o^2} = \sqrt{\frac{y_c^2 + R_c^2\sin^2\left(\frac{x_c}{R_c}\right)}{R_c^2 + y_c^2}}$$

Thus, for φ:

$$\varphi = \sin^{-1}(r_o) = \sin^{-1}\left(\sqrt{\frac{y_c^2 + R_c^2\sin^2\left(\frac{x_c}{R_c}\right)}{R_c^2 + y_c^2}}\right)$$

For unit radius, the factor c may define the ratio of φ to sin(φ) as follows:

$$y = fcy_o, \; x = \text{sgn}(x_c)fcx_o, \text{ where } c = \frac{\varphi_D(\varphi)}{\sin(\varphi)}$$

with the distortion lookup table being defined as:

$$\varphi_D(\varphi) = LUT(\varphi) = \varphi \frac{H_{Re}(\varphi)}{H_{Ref}(\varphi)} \text{ or } c \sim \frac{\varphi\left(1 + \left(\frac{p_o \varphi^2}{\varphi_o^2}\right)\right)}{\sin(\varphi)}$$

for a percentage distortion $p_o$ at field angle $\varphi_o$(rad).

Figure 6:
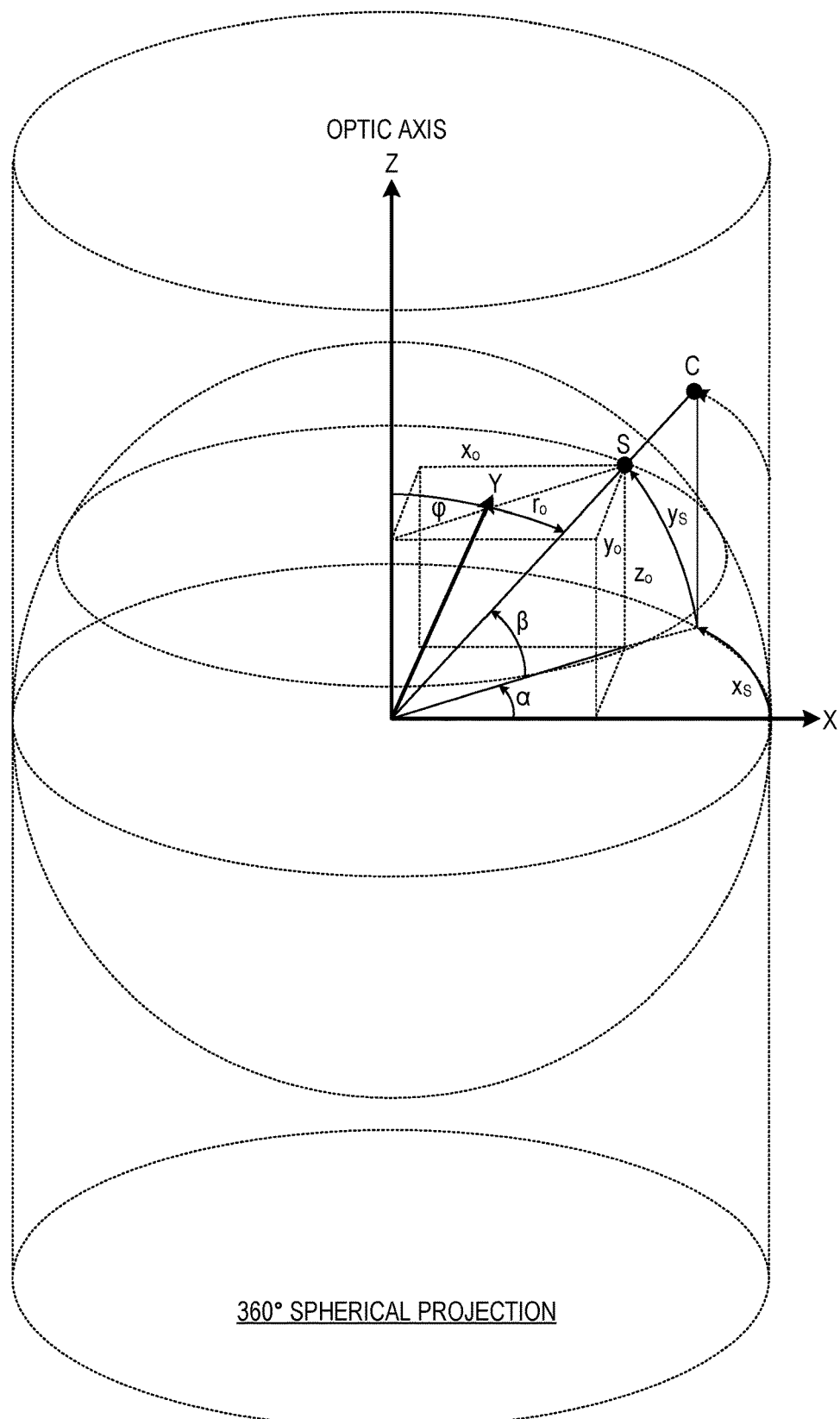
FIG. 6 schematically shows an example 360° spherical distortion correction projection.

FIG. 6 schematically shows an example 360° spherical distortion correction projection (sweep plane orthogonal to optic axis). The spherical projection maps image sensor coordinates in image sensor space to spherical coordinates. Prior to this mapping, the pixel grid of the raw image is parameterized into corresponding physical dimensions and may be shifted based on the measured camera-specific optical center, thus improving the resulting distortion correction for that particular camera, since the origin of the projection may be substantially matched to the optical axis of the lens. The image sensor coordinates are represented by (x, y) for the raw image. Projection radius R may be used as a scaler for setting the field of view captured within the corrected image pixel positions. For example, for an image sensor width A, the corrected image may be set to subtend and include a 360° horizontal field of view by setting R as:

$$R = \left(\frac{A}{2\pi}\right).$$

The spherical projection defines the relationship between the image sensor coordinates and the spherical coordinates (coordinates on sphere represented by the azimuth arclength $x_s$ and the elevation arclength $y_s$, thus positions in the corrected image) as an inverse function in the form of, x(f, R, $x_s$, $y_s$) & y(f, R, $x_s$, $y_s$), where $$\alpha = \frac{X_s}{R}, \; \beta = \left(\frac{y_s}{R}\right), \; \varphi = \frac{\pi}{2} - \beta, \; \beta = \frac{\pi}{2} - \varphi$$

Thus:

$$\varphi = \frac{\pi}{2} - \left(\frac{y_s}{R}\right)$$

Radius r may be determined from image height function r(φ):
r(φ)=fφ$_D$(φ), for φ in radians with the distortion lookup table being defined as:

$$\varphi_D(\varphi) = LUT(\varphi) = \varphi \frac{H_{Re}(\varphi)}{H_{Ref}(\varphi)}, \text{ or } r(\varphi) \sim f\varphi\left(1 + \frac{p_o\varphi^2}{\varphi_o^2}\right)$$

for percentage distortion p$_o$ at field angle φ$_o$(rad).
For (x,y) coordinates:

$$y = r(\varphi)\sin(\alpha), x = r(\varphi)\cos(\alpha)$$

Thus:

$$x = f\varphi_D(\varphi)\cos\left(\frac{x_s}{R}\right), y = f\varphi_D(\varphi)\sin\left(\frac{x_s}{R}\right) \text{ for } \varphi = \frac{\pi}{2} - \left(\frac{y_s}{R}\right),$$

with the distortion lookup table being defined as:

$$\varphi_D(\varphi) = LUT(\varphi) = \varphi \frac{H_{Re}(\varphi)}{H_{Ref}(\varphi)}$$

Or approximated:

$$x \sim f\varphi\left(1 + \frac{p_o\varphi^2}{\varphi_o^2}\right)\cos\left(\frac{x_s}{R}\right), y \sim f\varphi\left(1 + \frac{p_o\varphi^2}{\varphi_o^2}\right)\sin\left(\frac{x_s}{R}\right) \text{ for}$$

$$\varphi = \frac{\pi}{2} - \left(\frac{y_s}{R}\right),$$

for percentage distortion p$_o$ at field angle φ$_o$(rad).

Figure 7:
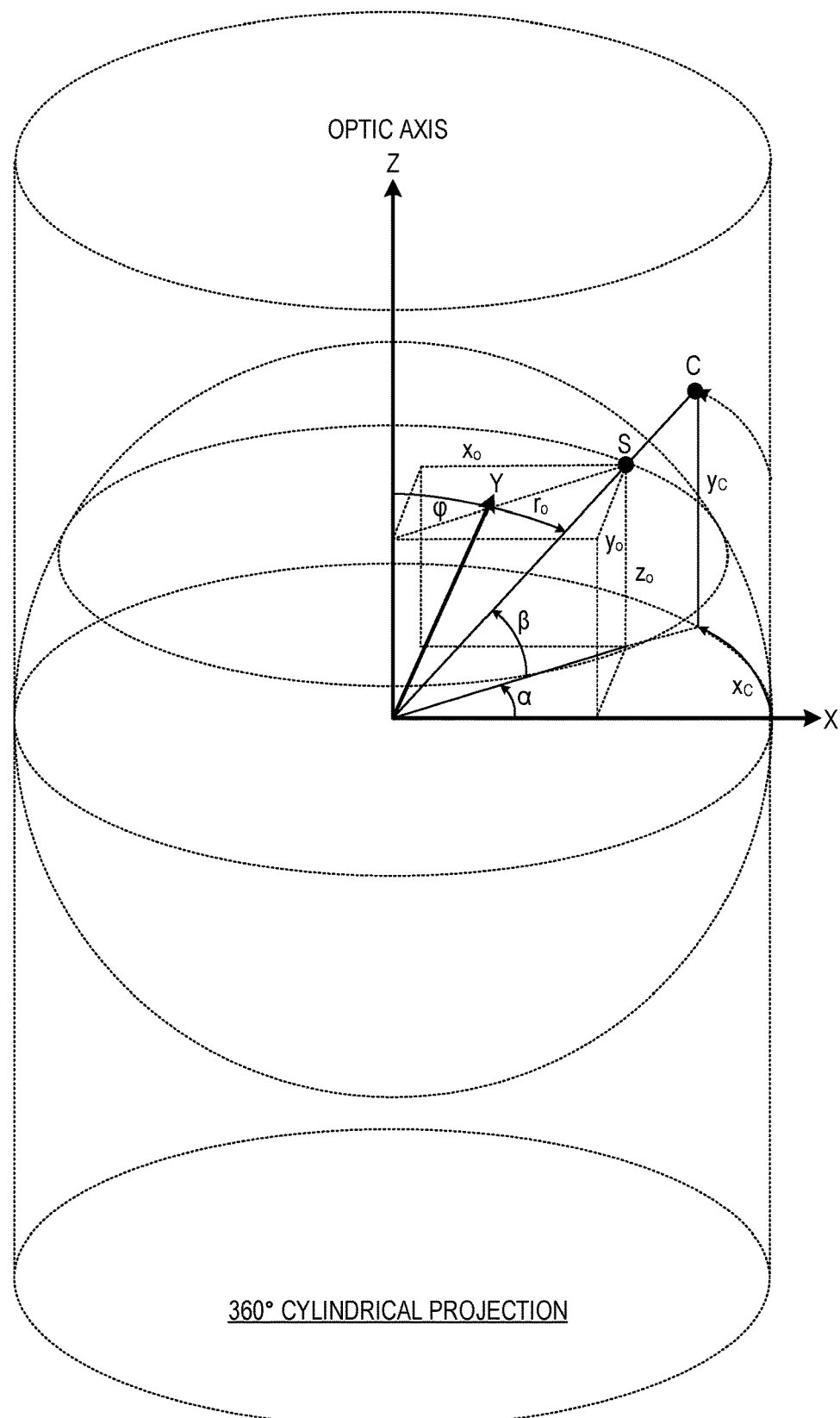
FIG. 7 schematically shows an example 360° cylindrical distortion correction projection.

FIG. 7 schematically shows an example 360° cylindrical distortion correction projection (sweep plane orthogonal to optic axis). The cylindrical projection maps image sensor coordinates in image sensor space to cylindrical coordinates. Prior to this mapping, the pixel grid of the raw image is parameterized into corresponding physical dimensions and may be shifted based on the measured camera-specific optical center, thus improving the resulting distortion correction for that particular camera, since the origin of the projection may be substantially matched to the optical axis of the lens. The image sensor coordinates are represented by (x, y) for raw image. Projection radius R may be used as a scaler for setting the field of view captured within the corrected image pixel positions. For example, for an image sensor width A, the corrected image may be set to subtend and include a 360° horizontal field of view by setting R as:

$$R = \left(\frac{A}{2\pi}\right).$$

The cylindrical projection defines the relationship between the image sensor coordinates and the cylindrical coordinates (coordinates on the cylinder represented by the azimuth arclength x$_c$ and the height length y$_c$, thus positions in the corrected image) as an inverse function in the form of, x(f, R, x$_c$, y$_c$) & y(f, R, x$_c$, y$_c$), where $$\alpha = \frac{x_c}{R}, \beta = \tan^{-1}\left(\frac{y_c}{R}\right), \varphi = \frac{\pi}{2} - \beta, \beta = \frac{\pi}{2} - \varphi$$

Thus:

$$\varphi = \frac{\pi}{2} - \tan^{-1}\left(\frac{y_c}{R}\right)$$

Radius r may be determined from image height function r(φ):
r(φ)=fφ$_D$(φ), for φ in radians with the distortion lookup table being defined as $$\varphi_D(\varphi) = LUT(\varphi) = \varphi \frac{H_{Re}(\varphi)}{H_{Ref}(\varphi)}, \text{ or } r(\varphi) \sim f\varphi\left(1 + \frac{p_o\varphi^2}{\varphi_o^2}\right)$$

for percentage distortion p$_o$ at field angle φ$_o$(rad).
For (x,y) coordinates:

$$y = r(\varphi)\sin(\alpha), x = r(\varphi)\cos(\alpha)$$

Thus:

$$x = f\varphi_D(\varphi)\cos\left(\frac{x_c}{R}\right), y = f\varphi_D(\varphi)\sin\left(\frac{x_c}{R}\right) \text{ for } \varphi = \frac{\pi}{2} - \tan^{-1}\left(\frac{y_c}{R}\right),$$

with the distortion lookup table being defined as:

$$\varphi_D(\varphi) = LUT(\varphi) = \varphi \frac{H_{Re}(\varphi)}{H_{Ref}(\varphi)}$$

Or approximated:

$$x \sim f\varphi\left(1 + \frac{p_o\varphi^2}{\varphi_o^2}\right)\cos\left(\frac{x_c}{R}\right), y \sim f\varphi\left(1 + \frac{p_o\varphi^2}{\varphi_o^2}\right)\sin\left(\frac{x_c}{R}\right) \text{ for}$$

$$\varphi = \frac{\pi}{2} - \tan^{-1}\left(\frac{y_c}{R}\right),$$

for percentage distortion p$_o$ at field angle φ$_o$(rad).

The above described distortion correction projections are provided as non-limiting examples. It will be appreciated that any suitable distortion correction projection may be applied to a raw image using a measured camera-specific optical center as a reference to generate a distortion corrected image.

Figure 8:
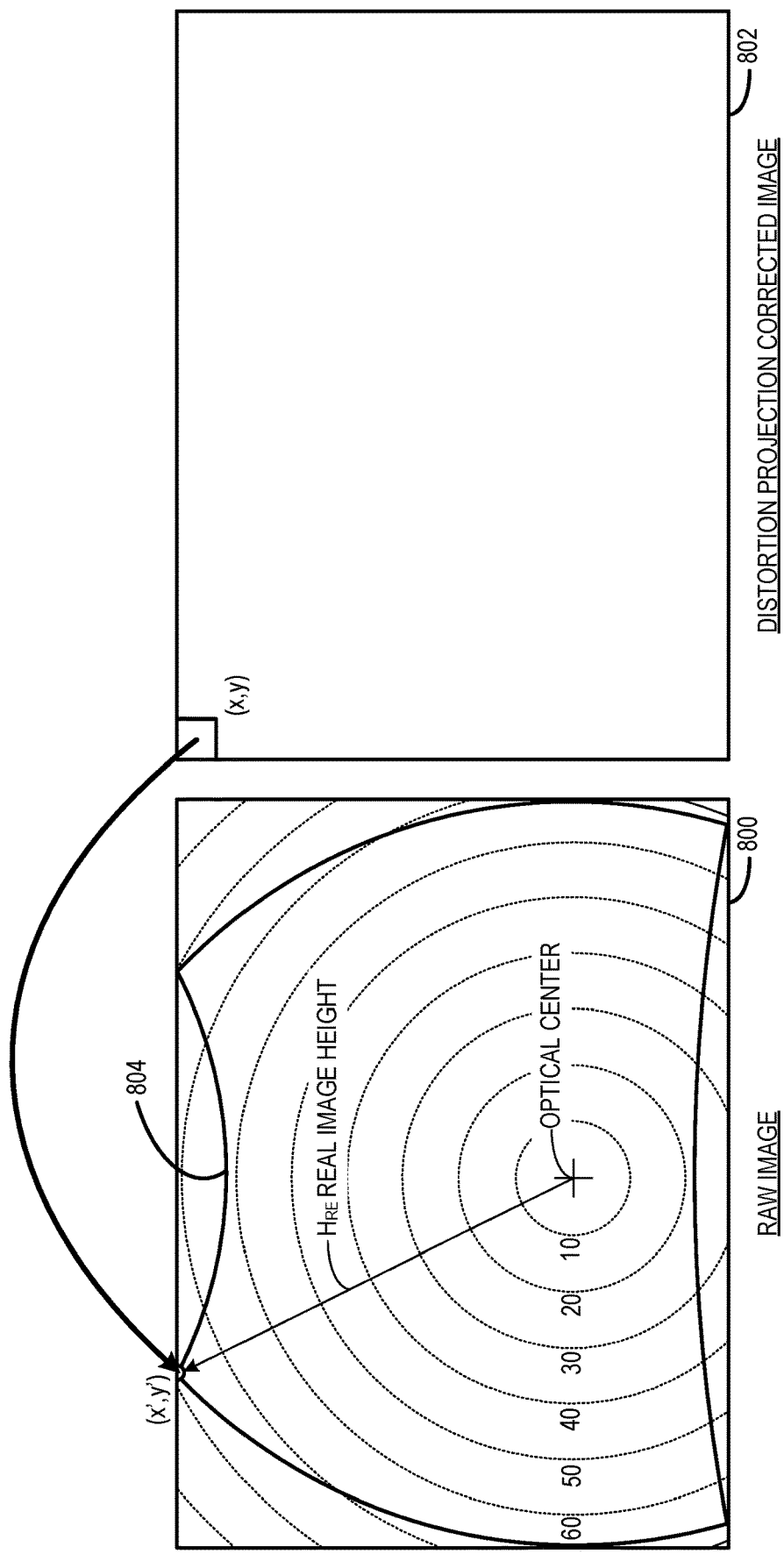
FIG. 8 shows an example mapping of a pixel location in a raw image to a pixel location in a distortion corrected image based on a distortion correction projection.

FIG. 8 shows an example raw image 800 and an example distortion corrected image 802. The raw image 800 includes contours in the form of concentric circles that represent the field angle (in degrees) of a lens. As one example, the lens may be capable of supporting up to 180 degrees within an image circle at an image plane. In the illustrated example, the contours represent 10-degree increments from 0 degrees to 90 degrees. An outline 804 in the raw image 800 represents frame edges of the distortion corrected image 802. In the illustrated example, the raw image 800 is generated by a camera supporting ~131 degrees of HFOV with a spherical or cylindrical projection. The only difference between the two distortion correction projections is that the height of the cylindrical distortion corrected image would be stretched as compared to a spherical distortion corrected image due to a tangent relationship of the vertical axis. In other examples, the lens may be capable of supporting more than 180 degrees within an image circle, and up to 360 degrees, for distortion correction projections including cylindrical and spherical. Rectilinear distortion correction to a given plane is theoretically limited to 180 degrees. Further, in some usage scenarios, such as machine vision, the corrected image may not be required to be confined to the rectangular frame edges of the distortion corrected image 802, as the image content outside the outline 804 in raw image 800 may be included in the distortion correction output. In such scenarios, a corrected image may be formed which may include content that is not confined within straight frame edges, and includes at least a portion of the corrected content beyond the outline 804. Such scenarios may be useful for applications where the corrected frame may not be presented to a user, such as facial recognition, and the additional FOV content maximizes coverage of a scene for a given camera FOV. In such case, the corrected pixels outside this content may be set to nan (not a number) or 0 intensity or grey level, thus the frame edges of raw image form a corrected image having shaped edges of content within the corrected frame.

In some implementations, the derived projection mapping equations may be performed as matrix operations in order to facilitate calculation of all pixels within a distortion corrected image in parallel. As one example, a mesh-grid array may be generated for both a 2D array of x values, X, and a 2D array of y values, Y. The 2D array X may be derived from a 1D x position grid and the 2D array Y may be derived from a 1D y position grid of the distortion corrected image 802. A matrix calculation of a given projection equation may be applied to the 2D arrays X and Y to determine a 2D array of x' values, X' in the raw image 800 and a 2D array of y' values, Y' in raw image 800. The values in the 2D arrays X' and Y' represent (x', y') pixel locations in the raw image 800 that project to (x, y) pixel locations in the distortion corrected image 802 (e.g., integer (x, y) pixel values). In some examples, this operation may include interpolation in order to improve the resolution of the mapping of the distortion corrected image 802 to the raw image 800. In such examples, fractional pixel locations (e.g., floating point (x', y') pixel values) may be generated by the operation. Further still, in some examples, the matrix arrays X' and Y' may be used to perform a given projection mapping in firmware within a device. In some such examples, such distortion correction projection mappings may be performed at frame rates suitable for video.

Returning to FIG. 2, in some implementations, the distortion correction machine 206 may be configured to select the distortion correction projection 212 from a plurality of different distortion correction projections (e.g., rectilinear, spherical, and cylindrical), such that the distortion corrected image 214 is generated according to the selected distortion correction projection. The distortion correction machine 206 may select a distortion correction projection from the plurality of different distortion correction projections in any suitable manner. In some examples, the distortion correction machine 206 may dynamically select a distortion correction projection from the plurality of different distortion correction projections based on operating conditions of the camera 100.

In some examples, the distortion correction machine 206 may be configured to select the distortion correction projection from the plurality of different distortion correction projections based on at least a mode of operation of the camera 100. Non-limiting examples of different modes that may dictate selection of the distortion correction projection include position and/or orientation of the camera (e.g. landscape, portrait), application used to capture the image (e.g., video chat application vs. general camera), image capture mode (e.g., scenic mode, portrait mode), and single image or multi-image capture (e.g., stitched panoramic or 360 degree image). As one example, a rectilinear projection may be selected for a scenic or landscape image or an image of a document or whiteboard. Such images may include relatively straight-line objects that are maintained through the pixel mapping by the rectilinear projection (the cylindrical and spherical projections would cause compound-angled-line objects to appear as arcs). As another example, a spherical or cylindrical projection may be selected for an image of a radially huddled group of people acquired during an interactive video conference. In such an image, the people may be positioned near the corners of the image, and the spherical and cylindrical projections may preserve the shape of the heads of the people (the rectilinear projection may cause the head to appear trapezoidal for off-axis field angles). A distortion correction projection may be selected from the plurality of different distortion correction projections based on any suitable mode of operation of the camera.

In some examples, the distortion correction machine 206 may be configured to select the distortion correction projection from the plurality of different distortion correction projections based on at least content in the raw image 204. In some implementations, the controller 116 optionally may include a machine-vision-analyzer machine 216 configured to analyze raw images acquired via the image sensor to identify and/or recognize content in the raw images. The machine-vision-analyzer machine 216 may employ any suitable machine vision technology to identify and/or recognize content in the raw images. As a nonlimiting example, the machine-vision-analyzer machine may include one or more previously-trained artificial neural networks. The type of content identified/recognized by the machine-vision-analyzer machine 216 may be provided as input to the distortion correction machine 206. The distortion correction machine 206 may be configured to select a distortion correction projection from the plurality of different distortion correction projections based on at least the recognized type of content in the raw image 204. In some examples, the machine-vision-analyzer machine 216 may be configured to perform lower-level analysis to identify features within the image, such as corner and edges that may dictate which distortion correction projection is selected. In other examples, the machine-vision-analyzer machine 216 may be configured to perform higher-level analysis to recognize objects in the raw image 206, such as different people. The distortion correction machine 206 may be configured to select a distortion correction projection from the plurality of different distortion correction projections based on any suitable content recognized within a raw image.

In some examples, the machine-vision analyzer machine 216 may be configured to analyze distortion corrected images to identify and/or recognize content in the distortion corrected images. In some cases, the distortion correction machine 206 may be configured to switch between two different distortion correction projections based on the content identified/recognized in a distortion corrected image. For example, the distortion correction machine 206 may generate a first distortion corrected image according to a first distortion correction projection. The machine-vision analyzer machine 216 may analyze the first distortion corrected image to identify/recognize content in the first distortion corrected image. Further, the distortion correction machine 206 may generate a second distortion corrected image according to a second, different distortion correction projection that is selected from a plurality of different distortion correction projection based on the identified/recognized content.

In some examples, the distortion correction machine 206 may be configured to select the distortion correction projection from the plurality of different distortion correction projections based on at least user input 218 indicating a selection of the distortion correction projection. For example, the camera 100 optionally may include a display and each of the plurality of different distortion correction projections may be listed and/or previewed in a user interface presented on the display. A user of the camera 100 may select one of the distortion correction projections to be used to generate the distortion corrected image 214. A distortion correction projection may be selected from the plurality of different distortion correction projections based on any suitable type of user input.

The distortion correction machine 206 may be configured to determine the relationship between the pixel locations of the pixels of the raw image and the translated pixel locations of the pixels of the distortion corrected image 214 according to the distortion projection 212 in any suitable manner. In some examples, the distortion correction machine 206 may be configured to use a lookup table that maps the pixel locations of pixels of the raw image to translated pixel locations of pixels of the distortion corrected image according to the distortion correction projection 212 based on the camera-specific optical center 118, the image sensor parameters 208, and the lens distortion parameters 210. In some examples, the distortion correction machine 206 may be configured to use a fit equation, where parameters of the fit equation are derived from the camera-specific optical center 118, the image sensor parameters 208, and the lens distortion parameters 210. In some examples, the distortion correction machine 206 may be configured to estimate the translated pixel locations using a parabolic percentage (p) distortion as a function of the field angle of the raw image 204.

The controller 116 may be configured to output the distortion corrected image 214 in any suitable form. In some examples, the controller 116 may output the distortion corrected image 214 as a data structure defining a matrix of pixels, each pixel including a value (e.g., color/brightness/depth). The controller 116 may be configured to output the distortion corrected image 214 to any suitable recipient internal or external to the camera 100. In one example, the controller 116 may be configured to output the distortion corrected image 214 to another processing component for additional image processing (e.g., filtering, computer vision, image compression). In some examples, the processing component may be incorporated into the camera 100. In some examples, the processing component may be incorporated into a remote computing device in communication with the camera 100. In another example, the controller 116 may be configured to output the distortion corrected image 214 to an internal or external display device for visual presentation.

Figure 9:
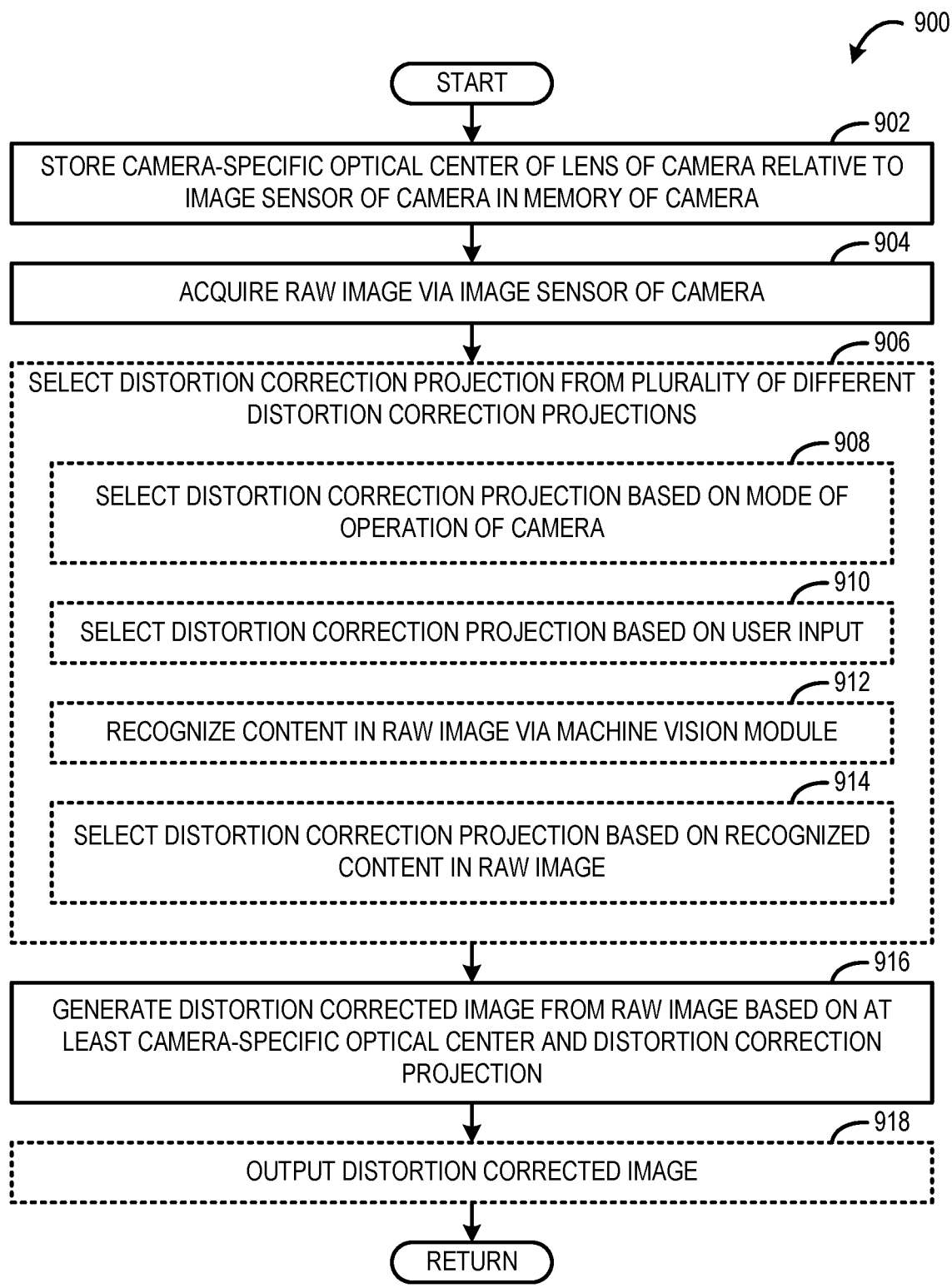
FIG. 9 is a flow chart of an example method for correcting lens distortion of a camera.

FIG. 9 is a flow chart of an example method 900 for correcting lens distortion of a camera. For example, the method 900 may be performed by the controller 116 of the camera 100 shown in FIG. 1. At 902, the method 900 includes storing a camera-specific optical center of a lens of the camera in memory of the camera. The camera-specific optical center may be measured after a position of the lens is center fixed relative to a position of the image sensor. At 904, the method 900 includes acquiring a raw image of a scene via an image sensor of the camera.

In some implementations, at 906, the method 900 optionally may include selecting a distortion correction projection from a plurality of different distortion correction projections. In some implementations, at 908, the method 900 optionally may include selecting the distortion correction projection based on at least a mode of operation of the camera. In some implementations, at 910, the method 900 optionally may include selecting the distortion correction projection based on at least user input indicating a selection of the distortion correction projection. In some implementations, at 912, the method 900 optionally may include recognizing content in the raw image (e.g., via a machine-vision-analyzer machine). At 914, the method 900 optionally may include selecting the distortion correction projection from the plurality of different distortion correction projections based on at least the recognized content in the raw image.

At 916, the method 900 includes generating a distortion corrected image from the raw image based on at least the camera-specific optical center and the distortion correction projection. In some examples, the distortion correction projection is further based on at least image sensor parameters and lens distortion parameters of the camera. The image sensor parameters may include a resolution of the image sensor and a pixel size of pixels of the image sensor. The lens distortion parameters may include distortion data, such as image real height versus field angle of the lens. At 918, the method 900 optionally may include outputting the distortion corrected image.

The above described distortion correction method may be broadly applicable to different types of cameras having various sizes and types of lenses. The distortion correction method enable high accuracy distortion correction without having to perform checkerboard calibration operations on the camera. The distortion correction method is scalable to a large volume of cameras while maintaining high accuracy distortion correction, because the distortion correction operations are based on a camera-specific optical center that is measured for each camera. Further, the distortion correction method may decrease distortion in relatively large-field-of-view lens systems, thus providing an economical approach for including large-field-of-view lens systems in even commodity electronic devices.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
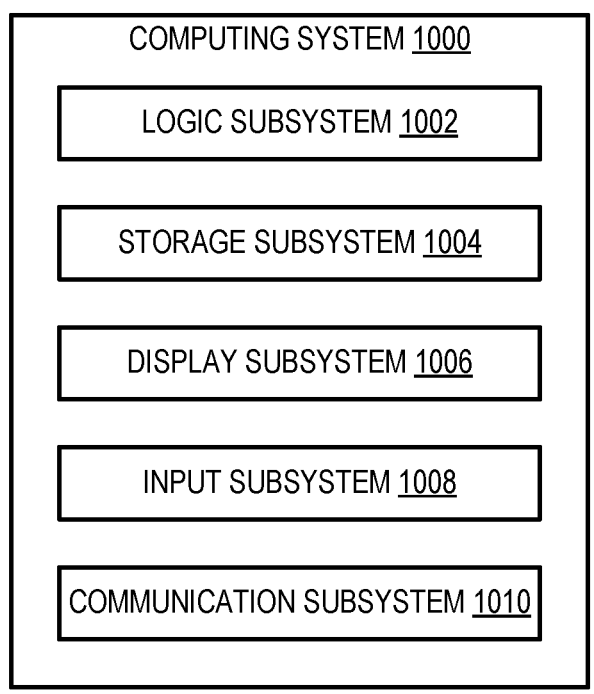
FIG. 10 schematically shows an example computing system.

FIG. 10 schematically shows a simplified representation of a computing system 1000 configured to provide any to all of the compute functionality described herein. Computing system 1000 may take the form of one or more cameras, personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, the computing system 1000 may take the form of the camera 100 shown in FIG. 1.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem 1002 may be configured to execute instructions that are part of one or more applications, services, or other logical constructs. The logic subsystem 1002 may include one or more hardware processors configured to execute software instructions. Additionally or alternatively, the logic subsystem 1002 may include one or more hardware or firmware devices configured to execute hardware or firmware instructions. Processors of the logic subsystem 1002 may be single-core or multi-core, and the instructions executed thereon may be configured for sequential, parallel, and/or distributed processing. Individual components of the logic subsystem 1002 optionally may be distributed among two or more separate devices, which may be remotely located and/or configured for coordinated processing. Aspects of the logic subsystem 1002 may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem 1002. When the storage subsystem 1004 includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem 1002 executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example. For example, the logic subsystem and the storage subsystem may be included in the controller 116 shown in FIGS. 1 and 2.

The logic subsystem 1002 and the storage subsystem 1004 may cooperate to instantiate one or more logic machines. The distortion correction machine 206 and the machine-vision-analyzer machine 216 shown in FIG. 2 are examples of such logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem 1006 may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some implementations, the input subsystem 1008 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem 1010 may be configured for communication via personal-, local- and/or wide-area networks.

In an example, a camera comprises: an image sensor; a lens positioned to direct object light from a scene onto the image sensor; a memory to store a camera-specific optical center of the lens relative to the image sensor, the camera-specific optical center being measured after a position of the lens is center fixed relative to a position of the image sensor; and a controller configured to: acquire a raw image of the scene via the image sensor; and generate a distortion corrected image from the raw image based on at least the camera-specific optical center. In this example or any other example, the controller is configured to generate the distortion corrected image by translating pixel locations of pixels of the raw image according to a distortion correction projection that is based on at least the camera-specific optical center. In this example or any other example, the distortion correction projection is further based on at least image sensor parameters and lens distortion parameters. In this example or any other example, the controller is configured to generate the distortion corrected image at least by using a lookup table that maps the pixel locations of pixels of the raw image to translated pixel locations of pixels of the distortion corrected image based on the camera-specific optical center, the image sensor parameters, and the lens distortion parameters. In this example or any other example, the distortion correction projection includes a rectilinear projection. In this example or any other example, the distortion correction projection includes a cylindrical projection. In this example or any other example, the distortion correction projection includes a spherical projection. In this example or any other example, the distortion correction projection includes a combination of two or more different distortion correction projections. In this example or any other example, the distortion correction projection is one of a plurality of different distortion correction projections, and the controller is configured to select the distortion correction projection from the plurality of different distortion correction projections. In this example or any other example, the controller is configured to select the distortion correction projection from the plurality of different distortion correction projections based on at least a mode of operation of the camera. In this example or any other example, the controller is configured to select the distortion correction projection from the plurality of different distortion correction projections based on at least user input indicating the distortion correction projection. In this example or any other example, the controller is configured to recognize content in the raw image and select the distortion correction projection from the plurality of different distortion correction projections based on at least the recognized content in the raw image.

In an example, a method for correcting lens distortion of a camera comprises: storing a camera-specific optical center of a lens of the camera relative to an image sensor of the camera in memory of the camera, the camera-specific optical center being measured after a position of the lens is center fixed relative to a position of the image sensor; acquiring a raw image of a scene via the image sensor; and generating a distortion corrected image from the raw image based on at least the camera-specific optical center. In this example or any other example, generating the distortion corrected image includes translating pixel locations of pixels of the raw image according to a distortion correction projection that is based on at least the camera-specific optical center. In this example or any other example, the distortion correction projection is further based on at least image sensor parameters and lens distortion parameters. In this example or any other example, the distortion correction projection is one of a plurality of different distortion correction projections, and the method further comprises selecting the distortion correction projection from the plurality of different distortion correction projections. In this example or any other example, the distortion correction projection is selected from the plurality of different distortion correction projections based on at least a mode of operation of the camera. In this example or any other example, the distortion correction projection is selected from the plurality of different distortion correction projections based on user input indicating the distortion correction projection. In this example or any other example, the method further comprises recognizing content in the raw image, and the distortion correction projection is selected from the plurality of different distortion correction projections based on the recognized content in the raw image.

In an example, a camera comprises: an image sensor; a lens positioned to direct object light from a scene onto the image sensor; a memory to store a camera-specific optical center of the lens relative to the image sensor, the camera-specific optical center being measured after a position of the lens is center fixed relative to a position of the image sensor; and a controller configured to: acquire a raw image of the scene via the image sensor; select a distortion correction projection from a plurality of different distortion correction projections based on operating conditions of the camera; and generate a distortion corrected image from the raw image by translating pixel locations of pixels of the raw image to translated pixel locations of the distortion corrected image based on at least the camera-specific optical center and the distortion correction projection.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A camera comprising:
   an image sensor;
   a lens positioned to direct object light from a scene onto the image sensor;
   a memory to store a camera-specific optical center of the lens, wherein the camera-specific optical center is measured after a position of the lens is center fixed relative to a position of the image sensor; and
   a controller configured to:
   acquire a raw image of the scene via the image sensor;
   select a distortion correction projection from a plurality of different distortion correction projections; and
   generate a distortion corrected image from the raw image by translating pixel locations of pixels of the raw image to translated pixel location of the distortion corrected image based on at least the camera-specific optical center and the distortion correction projection.

2. The camera of claim 1, wherein the distortion correction projection is further based on at least image sensor parameters and lens distortion parameters.

3. The camera of claim 2, wherein the controller is configured to generate the distortion corrected image at least by using a lookup table that maps the pixel locations of pixels of the raw image to translated pixel locations of pixels of the distortion corrected image based on the camera-specific optical center, the distortion correction projection, the image sensor parameters, and the lens distortion parameters.

4. The camera of claim 1, wherein the plurality of different distortion correction projections includes a rectilinear projection.

5. The camera of claim 1, wherein the plurality of different distortion correction projections includes a cylindrical projection.

6. The camera of claim 1, wherein the plurality of different distortion correction projections includes a spherical projection.

7. The camera of claim 1, wherein the controller is configured to select the distortion correction projection from the plurality of different distortion correction projections based on at least a mode of operation of the camera.

8. The camera of claim 1, wherein the controller is configured to select the distortion correction projection from the plurality of different distortion correction projections based on at least user input indicating the distortion correction projection.

9. The camera of claim 1, wherein the controller is configured to recognize content in the raw image and select the distortion correction projection from the plurality of different distortion correction projections based on at least the recognized content in the raw image.

10. A method for correcting lens distortion of a camera, the method comprising:
    storing a camera-specific optical center of a lens of the camera in memory of the camera, wherein the camera-specific optical center is measured after a position of the lens is center fixed relative to a position of an image sensor;
    acquiring a raw image of a scene via the image sensor;
    select a distortion correction projection from a plurality of different distortion correction projections; and
    generating a distortion corrected image from the raw image by translating pixel locations of pixels of the raw image to translated pixel locations of the distortion corrected image based on at least the camera-specific optical center and the distortion correction projection.

11. The method of claim 10, wherein the distortion correction projection is further based on at least image sensor parameters and lens distortion parameters.

12. The method of claim 10, wherein the distortion correction projection is selected from the plurality of different distortion correction projections based on at least a mode of operation of the camera.

13. The method of claim 10, wherein the distortion correction projection is selected from the plurality of different distortion correction projections based on user input indicating the distortion correction projection.

14. The method of claim 10, the method further comprises recognizing content in the raw image, and wherein the distortion correction projection is selected from the plurality of different distortion correction projections based on the recognized content in the raw image.

15. A camera comprising:
    an image sensor;
    a lens positioned to direct object light from a scene onto the image sensor;
    a memory to store a camera-specific optical center of the lens relative to the image sensor, the camera-specific optical center being measured after a position of the lens is center fixed relative to a position of the image sensor; and
    a controller configured to:
    acquire a raw image of the scene via the image sensor;
    select a distortion correction projection from a plurality of different distortion correction projections based on operating conditions of the camera; and
    generate a distortion corrected image from the raw image by translating pixel locations of pixels of the raw image to translated pixel locations of the distortion corrected image based on at least the camera-specific optical center and the distortion correction projection.

16. The method of claim 10, wherein the plurality of different distortion correction projections includes a rectilinear projection.

17. The method of claim 10, wherein the plurality of different distortion correction projections includes a cylindrical projection.

18. The camera of claim 10, wherein the plurality of different distortion correction projections includes a spherical projection.

19. The camera of claim 15, wherein the distortion correction projection is further based on at least image sensor parameters and lens distortion parameters.

20. The camera of claim 19, wherein the controller is configured to generate the distortion corrected image at least by using a lookup table that maps the pixel locations of pixels of the raw image to translated pixel locations of pixels of the distortion corrected image based on the camera-specific optical center, the distortion correction projection, the image sensor parameters, and the lens distortion parameters.

* * * * *